US011334612B2

(12) United States Patent
Kota et al.

(10) Patent No.: US 11,334,612 B2
(45) Date of Patent: May 17, 2022

(54) MULTILEVEL REPRESENTATION LEARNING FOR COMPUTER CONTENT QUALITY

(71) Applicant: Microsoft Technology Licensing, LLC, Redmond, WA (US)

(72) Inventors: Nagaraj Kota, Bangalore (IN); Amit Chandak, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 673 days.

(21) Appl. No.: 15/890,099

(22) Filed: Feb. 6, 2018

(65) Prior Publication Data

US 2019/0243919 A1 Aug. 8, 2019

(51) Int. Cl.
| | | |
|---|---|---|
| *G06F 16/35* | (2019.01) | |
| *G06K 9/62* | (2022.01) | |
| *G09B 5/06* | (2006.01) | |
| *G06F 16/335* | (2019.01) | |
| *G06F 16/00* | (2019.01) | |
| *G06Q 50/00* | (2012.01) | |

(52) U.S. Cl.
CPC .............. *G06F 16/35* (2019.01); *G06F 16/00* (2019.01); *G06F 16/335* (2019.01); *G06K 9/6267* (2013.01); *G09B 5/06* (2013.01); *G06Q 50/01* (2013.01)

(58) Field of Classification Search
CPC ........ G06F 16/35; G06F 16/00; G06F 16/335; G06F 16/353; G06F 16/906; G06F 16/45; G06F 16/954; G06F 16/313; G06F 16/285; G06F 16/383; G06F 16/9024; G06F 16/93; G06K 9/6267; G09B 5/06; G06Q 50/01
See application file for complete search history.

(56) References Cited

U.S. PATENT DOCUMENTS

| | | | |
|---|---|---|---|
| 10,297,070 B1* | 5/2019 | Zhu | G06T 15/205 |
| 2009/0163191 A1* | 6/2009 | Henderson | H04M 1/576 |
| | | | 455/415 |
| 2017/0186032 A1* | 6/2017 | Rangasamy Kannadasan | |
| | | | H04L 63/1425 |
| 2017/0277790 A1* | 9/2017 | Alonso | H04L 67/306 |
| 2017/0289589 A1* | 10/2017 | Koumchatzky | H04N 21/4828 |
| 2017/0352044 A1* | 12/2017 | Yoo | G06Q 50/01 |
| 2018/0068675 A1* | 3/2018 | Variani | G10L 19/008 |
| 2018/0152558 A1* | 5/2018 | Chan | H04W 4/16 |

(Continued)

*Primary Examiner* — Hares Jami
*Assistant Examiner* — Andalib F Lodhi
(74) *Attorney, Agent, or Firm* — Schwegman Lundberg & Woessner, P.A.

(57) ABSTRACT

In an example, a piece of content is obtained. The piece of content is segmented into a plurality of segments. Each of the plurality of segments is divided into a plurality of units. Then, for each of the plurality of units for each segment, a quality model is used to pass the unit through a long short-term memory (LSTM) corresponding to the unit, causing an embedding of the unit and generating one or more parameters. For each of the plurality of segments for the piece of content, the quality model is used to pass the segment, and one or more parameters obtained from LSTMs corresponding to units within the segment, through an LSTM corresponding to the segment, causing an embedding of the segment. The piece of content is then classified as spam based on the embeddings of the plurality of segments for the piece of content, using the quality model.

21 Claims, 8 Drawing Sheets

(56) References Cited

U.S. PATENT DOCUMENTS

| | | | |
|---|---|---|---|
| 2018/0197548 A1* | 7/2018 | Palakodety | G10L 17/08 |
| 2018/0210896 A1* | 7/2018 | Guo | G06F 16/5838 |
| 2018/0240013 A1* | 8/2018 | Strope | G06F 16/335 |
| 2018/0300608 A1* | 10/2018 | Sevrens | G06N 3/084 |
| 2020/0265192 A1* | 8/2020 | Lin | G06N 3/0454 |

* cited by examiner

MULTILEVEL REPRESENTATION LEARNING FOR COMPUTER CONTENT QUALITY

TECHNICAL FIELD

The present disclosure generally relates to technical problems encountered in determining the quality of computer content. More specifically, the present disclosure relates to the use of multilevel representation learning for computer content quality.

BACKGROUND

The rise of the Internet has occasioned two different but related phenomena: the increase in the presence of social networks, with their corresponding user profiles visible to large numbers of people, and the increase in the use of these social networks to exchange information. Oftentimes, this information comes in the form of third-party online content, such as articles and videos, that are shared among users of a social networking service. Some social networking services provide a "feed" or similar area of the social networking service, where such content can be served to users.

Determining which online content to serve to users in their feeds can be a daunting technical challenge. Numerous factors may go into determining which content to serve and the ordering (ranking) of such content, including attributes of the viewer and the content. One attribute of content that is difficult to measure is quality. While quality can mean different things to different people, for social networking services the quality metric will often come down to how likely it is that the content is spam, i.e., a solicitation or advertisement, as opposed to an otherwise legitimate, i.e., non-commercial, expression.

Measuring the quality of online content is technically challenging due to the dynamic nature of content, and the limited and/or biased user/editor feedback with regards to quality.

BRIEF DESCRIPTION OF THE DRAWINGS

Some embodiments of the technology are illustrated, by way of example and not limitation, in the figures of the accompanying drawings.

DETAILED DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, content representation is learned along with quality classes by imposing a hierarchical structure. Using hierarchical long short-term memories (LSTMs), precision and recall can be improved over non-hierarchical solutions. The hierarchical nature of the solution permits parameter sharing across levels of the hierarchy.

Use of this solution provides technical improvements over non-hierarchical methods such as vowpal_wabbit and Fast-Text. Specifically, this solution performs roughly 7.8% better than vowpal_wabbit and 2.4% better than FastText in performance testing.

Additionally, hierarchical LSTMs train over six times as fast with similar precision and recall metrics over flat bi-directional LSTMs.

Figure 1:
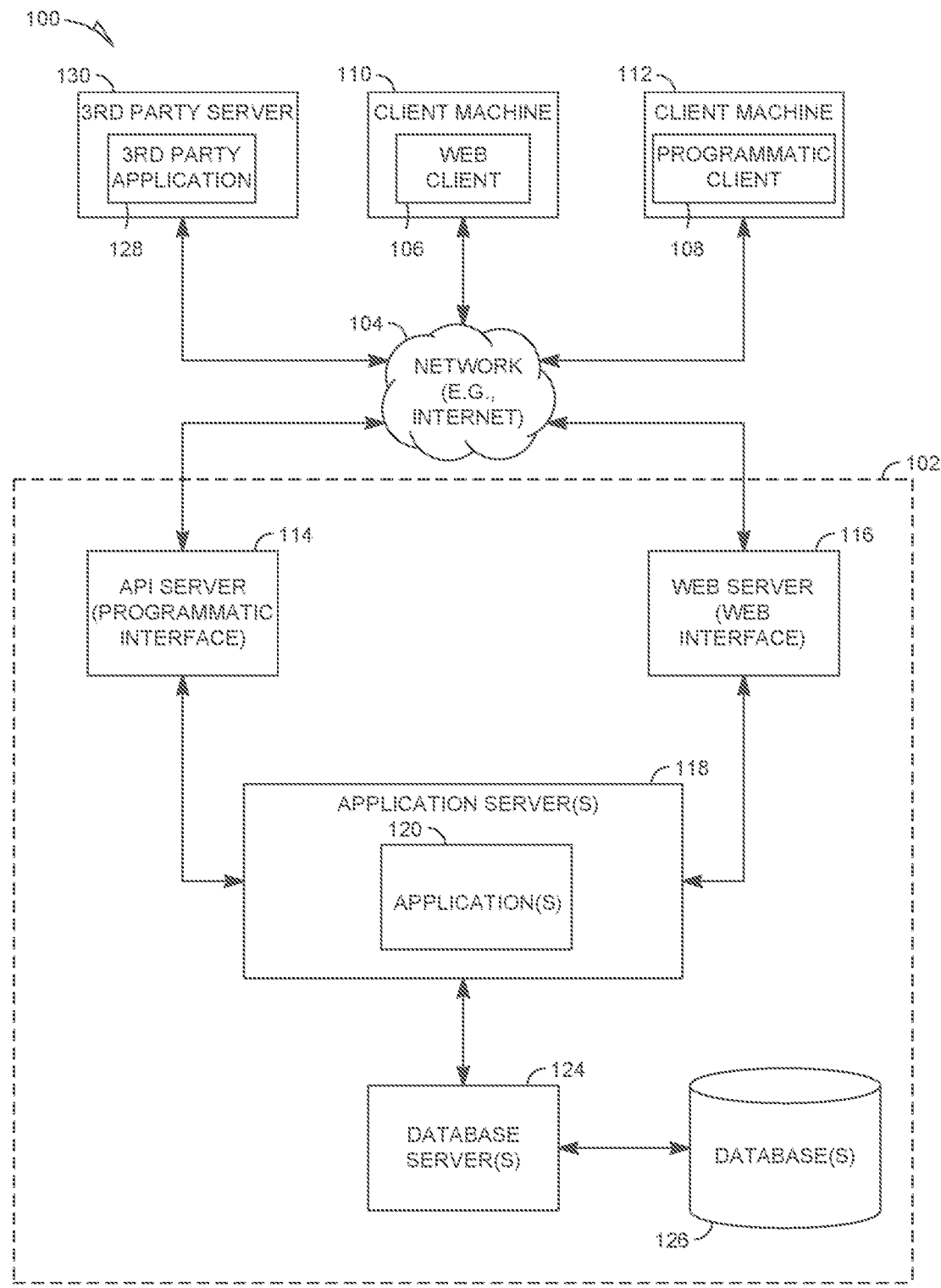
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application programming interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server (e.g., the API server 114) may communicate with the mobile app and the application server(s) 118 in order to make the features of the present disclosure available on the mobile device.

Figure 2:
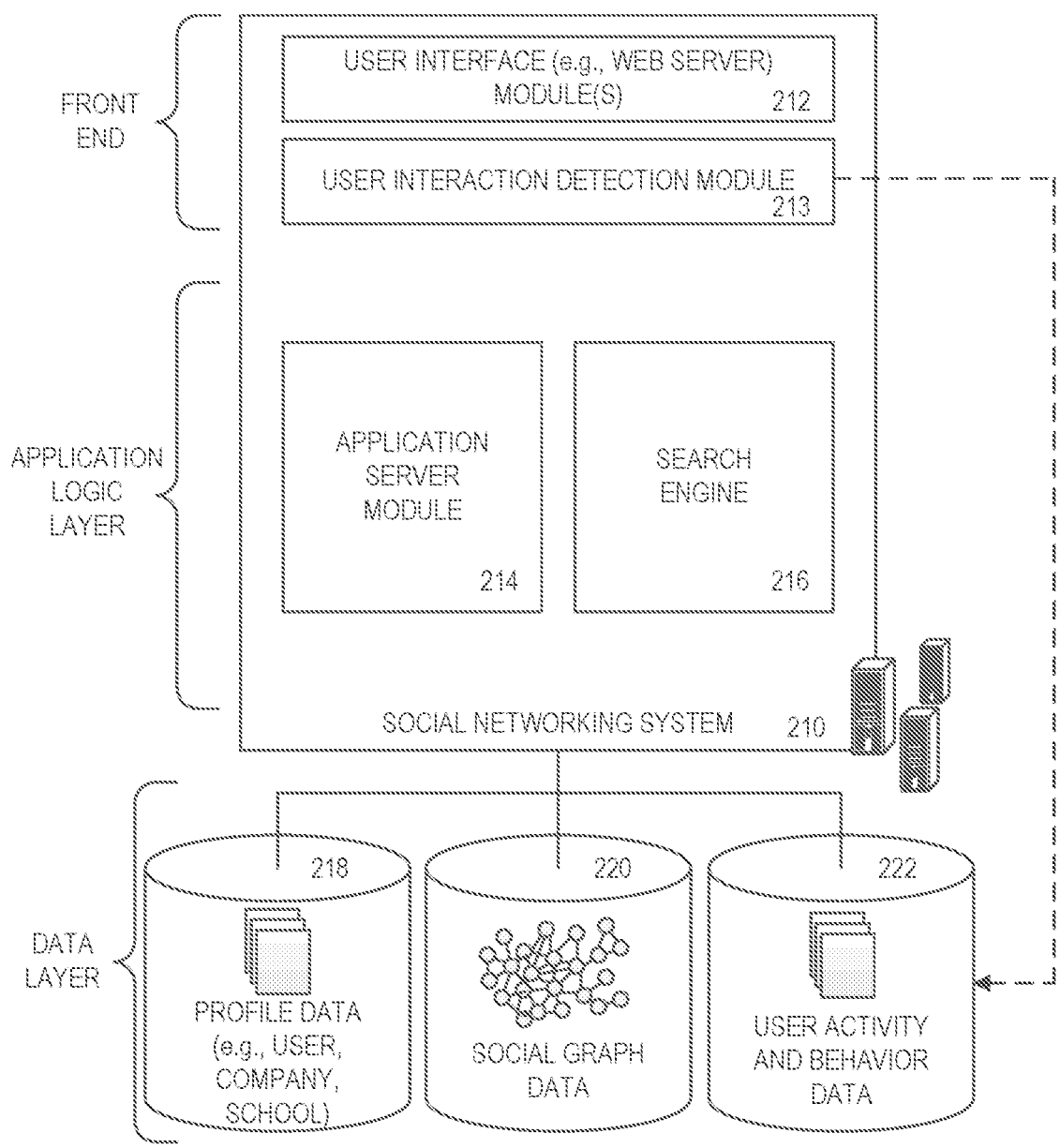
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that users have with different applications 120, services, and content presented. As shown in FIG. 2, upon detecting a particular interaction, the user interaction detection module 213 logs the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level, or seniority level within a particular organization. In some embodiments, importing or otherwise accessing data from one or more externally hosted data sources may enrich profile data for both users and organizations. For instance, with organizations in particular, financial data may be imported from one or more external data sources and made pan of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, "following" another user typically is a unilateral operation and, at least in some embodiments, does not require acknowledgement or approval by the user who is being followed. When one user follows another, the user who is following may receive status updates (e.g., in an activity or content stream) or other messages published by the user being followed, or relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application 120 may be able to request and/or receive one or more navigation recommendations. Such applications 120 may be browser-based applications 120, or may be operating system-specific In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and user activity and behavior data (stored, e.g., in the user activity and behavior database 222), as well as job postings. The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
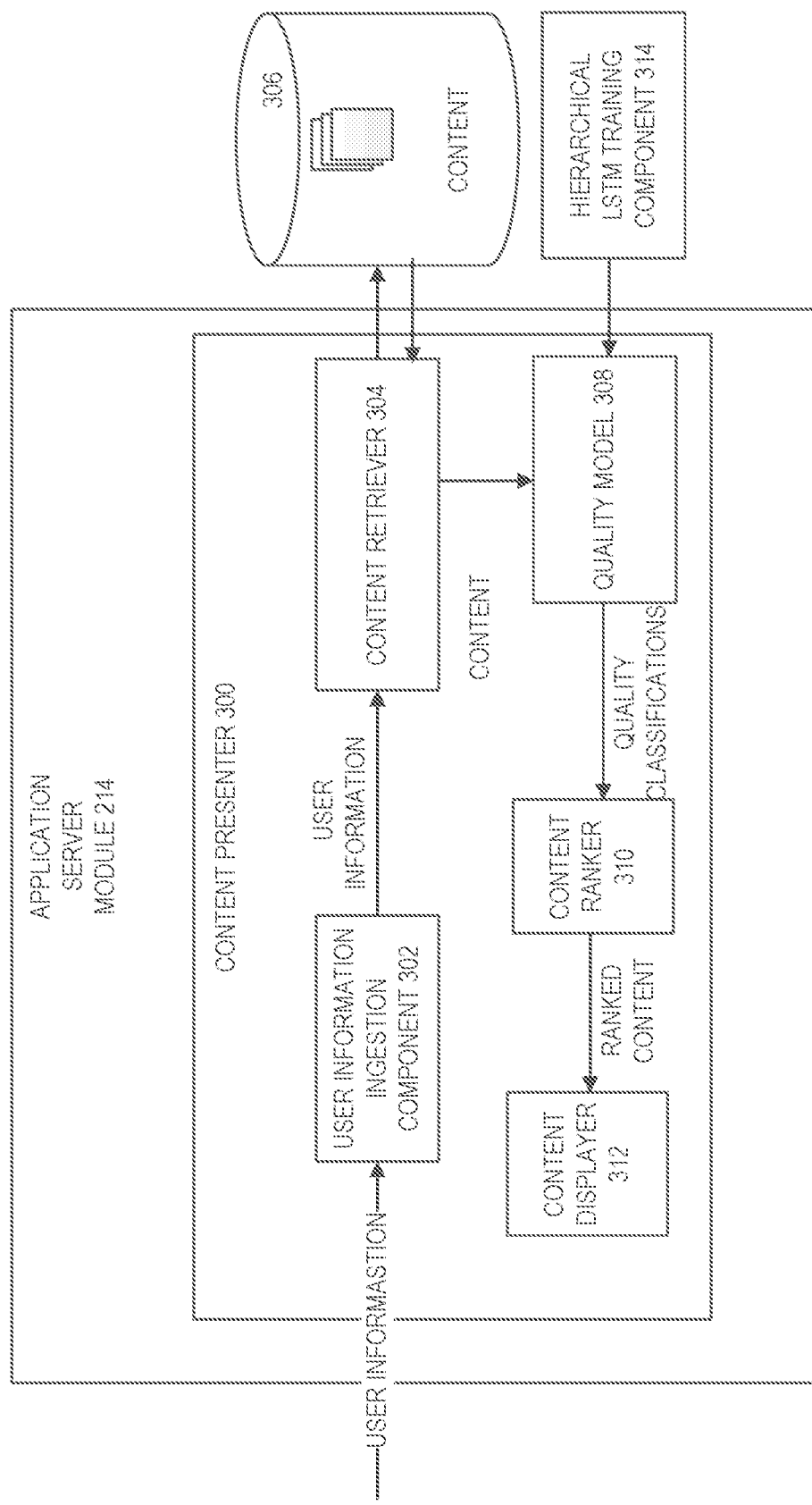
FIG. 3 is a block diagram illustrating the application server module of FIG. 2 in more detail, in accordance with an example embodiment.

FIG. 3 is a block diagram illustrating the application server module 214 of FIG. 2 in more detail, in accordance with an example embodiment. While in many embodiments the application server module 214 will contain many sub-components used to perform various different actions within the social networking service system 210, in FIG. 3 only those components that are relevant to the present disclosure are depicted. The application server module 214 includes a content presenter 300. The content presenter 300 presents one or more available pieces of content to a user of a social networking service. In an example embodiment this content may be presented in a feed or similar area of the social networking service.

A user information ingestion component 302 obtains user information regarding a user of a social networking service. This may be performed in a number of different ways. In one example embodiment, the user information ingestion component 302 receives a user identification that is obtained when a user logs into the social networking service. This user identification is then used to query a user profile database to obtain a user profile for the user. The user profile then contains the user information, such as skills, schools attended, degrees, etc. In another example embodiment, the user information front the user profile is sent to the user information ingestion component 302 without the need for a user identification to be used.

The user information ingestion component 302 forwards the user information to a content retriever, which obtains one or more potential pieces of content to display from a content database 306 and feeds the user information and the one or more potential pieces of content into a quality model 308, which is designed to output a quality classification for each of the one or more potential pieces of content. A content ranker 310 then ranks the one or more potential pieces of content based on various factors, including the quality of the content. In some alternative embodiments, the quality classifications are used to provide limits on the sharing of particular pieces of content. For example, a piece of content classified as spam may simply be removed from the potential pieces of content to be served for all users. A piece of content classified as low quality (but not spam) may be served only to users who have a first-degree connection in the social network to the user sharing the piece of content.

The ranked pieces of content are then sent to a content displayer 312, which displays one or more pieces of content based on the ranking.

In an example embodiment, quality model 308 is a hierarchical LSTM model that is trained using a hierarchical LSTM training component 314.

It should be noted that the above architecture is described in terms of the quality model 308 being applied during the process of serving content to an individual user, essentially in an online manner. In other example embodiments, the quality model 308 may be used in an offline manner, such as applied to content in the content database 306 either periodically or as content is loaded into the content database 306. In such embodiments, the content may be tagged with a quality classification as metadata, and this metadata can be used in determining whether the content retriever 304 retrieves the piece of content for the user. In some example embodiments, content tagged as spam may be removed from the content database 306.

Figure 4:
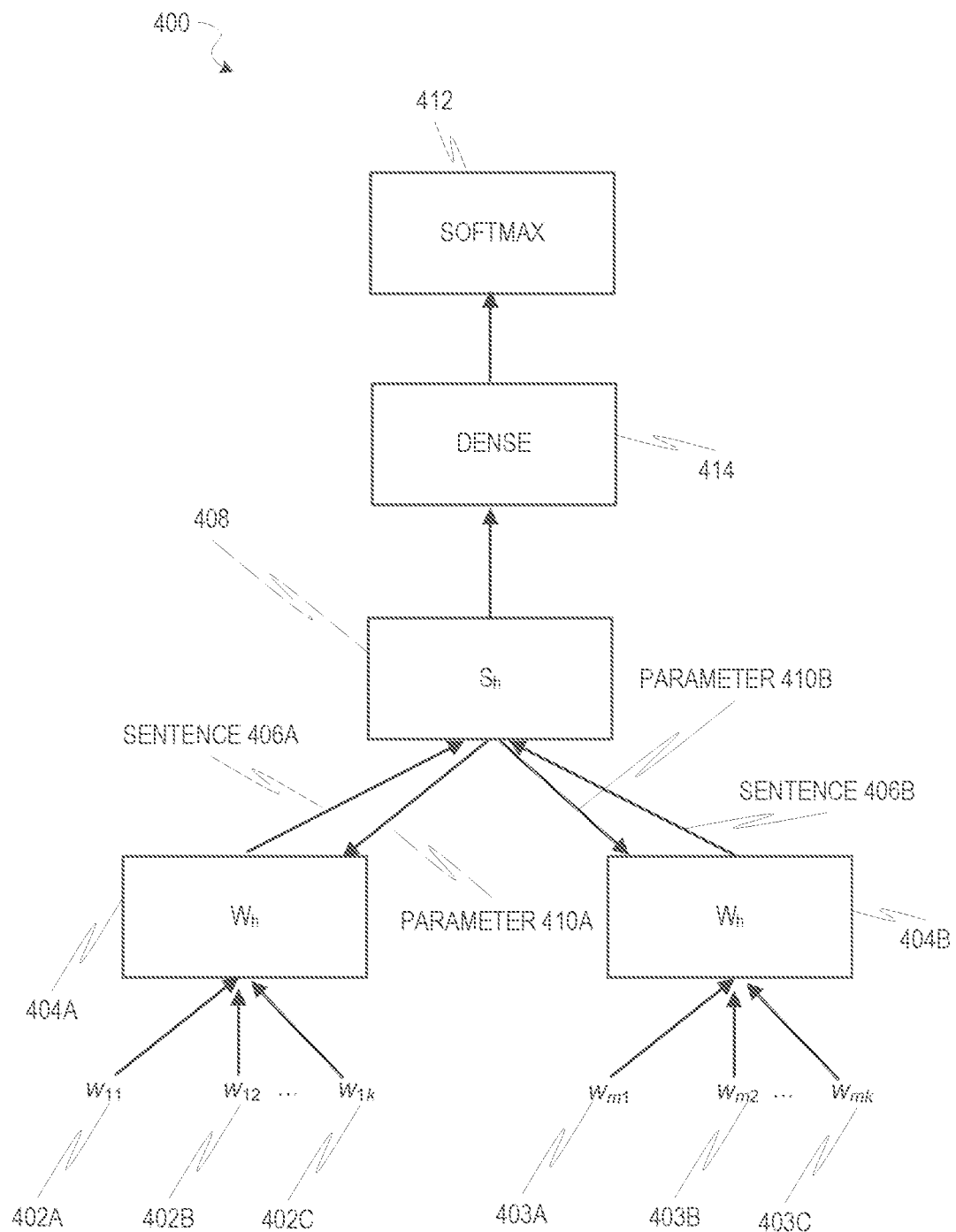
FIG. 4 is a block diagram illustrating neural hierarchical long short-term memory (LSTM) architecture used in a quality model, in accordance with an example embodiment.

FIG. 4 is a block diagram illustrating a neural hierarchical LSTM architecture 400 used in the quality model 308 in accordance with an example embodiment. Here the architecture 400 is described with respect to textual content, such as an article. As such, the content can be broken down into sentences which can further be broken down into words. Sequences of words and sequences of sentences are captured through their respective LSTMs. In an example embodiment, the LSTMs are bidirectional LSTMs) (Bi-LSTMs). Thus, for example, words 402A, 402B, 402C, and words 403A, 403B, 403C are encoded using different respective Bi-LSTMs 404A, 404B. Sentences 406A, 406B may be encoded using Bi-LSTMs 408. Notably, parameters, such as parameters 410A and 410B, are shared between levels of the hierarchy. This is in contrast to prior an linear classifiers, which do not share parameters among features and classes.

Class labels are obtained through a softmax layer 412 after having been passed through a dense layer 414. A dense layer 414, also known as a fully connected layer, is a layer that performs classifications on features extracted by other layers and downsampled by pooling layers. In a dense layer, every node in the layer is connected to every node in the preceding layer. The softmax layer 412 implements a softmax function, or normalized exponential function, which is a generalization of a logistic function that squashes a K-dimensional vector z of arbitrary real values to a K-dimensional vector σ(z) of real values in the range [0, 1] that add up to 1. The function may be given by $$\sigma: \mathbb{R}^K \to [0, 1]^K$$

$$\sigma(z)_j = \frac{e^{z_j}}{\sum_{k=1}^{K} e^{z_k}}$$

The network may be learned through back propagation using a categorical cross-entropy loss function.

The quality model 308 projects a piece of content into a vector representation on which a classifier is built to perform content classification. The piece of content may be referred to as a document, although it can be in the form of a text document or another file type such as a video file. The document level vector is built progressively from lower-level vectors (such as word-level vectors in the case of textual documents) by using the hierarchical structure.

A word encoder embeds words into vectors through an embedding matrix. In an example embodiment, a bidirectional LSTM is used to obtain annotations of words by summarizing information from both directions for words, thus incorporating contextual information in the annotation. The bidirectional LSTM may contain a forward LSTM, which reads the sentence from the first word to the last word, and a backward LSTM, which reads the sentence from the last word to the first word. An annotation for a given word may be obtained by concatenating the forward hidden state, which summarizes the information of the whole sentence centered around the given word.

Not all words contribute equally to the representation of a sentence's meaning. Thus, an attention mechanism may be used to extract words that are important to the meaning of the sentence and aggregate the representation of those informative words to form a sentence vector. The word annotation is fed through a one-layer multilayer perceptron (MLP) to obtain a hidden representation of the word annotation. The importance of the word is measured as a similarity of the hidden representation with a word-level context vector to obtain a normalized importance weight through a softmax function. Then the sentence vector may be computed as a weighted sum of the word annotations based on the weights. The context vector may be viewed as a high-level representation of the most informative words over the words.

Given sentence vectors, a document vector may then be obtained in a similar way. Bidirectional LSTMs may be used to encode the sentences. To reward sentences that are clues to correctly classifying a document, another attention mechanism is used and a sentence-level context vector is introduced, which is used to measure the importance of the sentences.

The document vector is then a high-level representation of the document and can be used as features for document classification in the dense layer 414 and softmax layer 412.

Pseudocode for implementing each of these layers in a high-level API for deep-learning to compose multilevel representation for a document may be as follows:

```
#Word embedding layer
embedding_layer=Embedding(self.MAX_NB_WORDS,
    self.EMBEDDING_DIM,
    weights=self.embedding_matrix,
    input_length=self.MAX_SENT_LENGTH,
    trainable=True)
#Sentence-Level modelling through Bi-LSTMs
sentence_input=Input(shape=(self.MAX_
    SENT_LENGTH,))
embedded_sequences=embedding_layer(sentence_input)
l_lstm   =Bidirectional(LSTM(self.LSTM_STATES_DIM))
    (embedded_sequences)
sentEncoder=Model(sentence_input, l_lstm)
#Document-Level, recursively applying sentence encoder
doc_input=Input(shape=(self.MAX_SENTS,
    self.MAX_SENT_LENGTH))
docEncoder=TimeDistributed(sentEncoder)(doc_input)
l_lstm_sent=Bidirectional(LSTM(self.
    LSTM_STATES_DIM)(docEncoder)
preds=Dense(3, activation='softmax')(l_lstm_sent)
document model=Mode(doc_input, preds)
```

Figure 5:
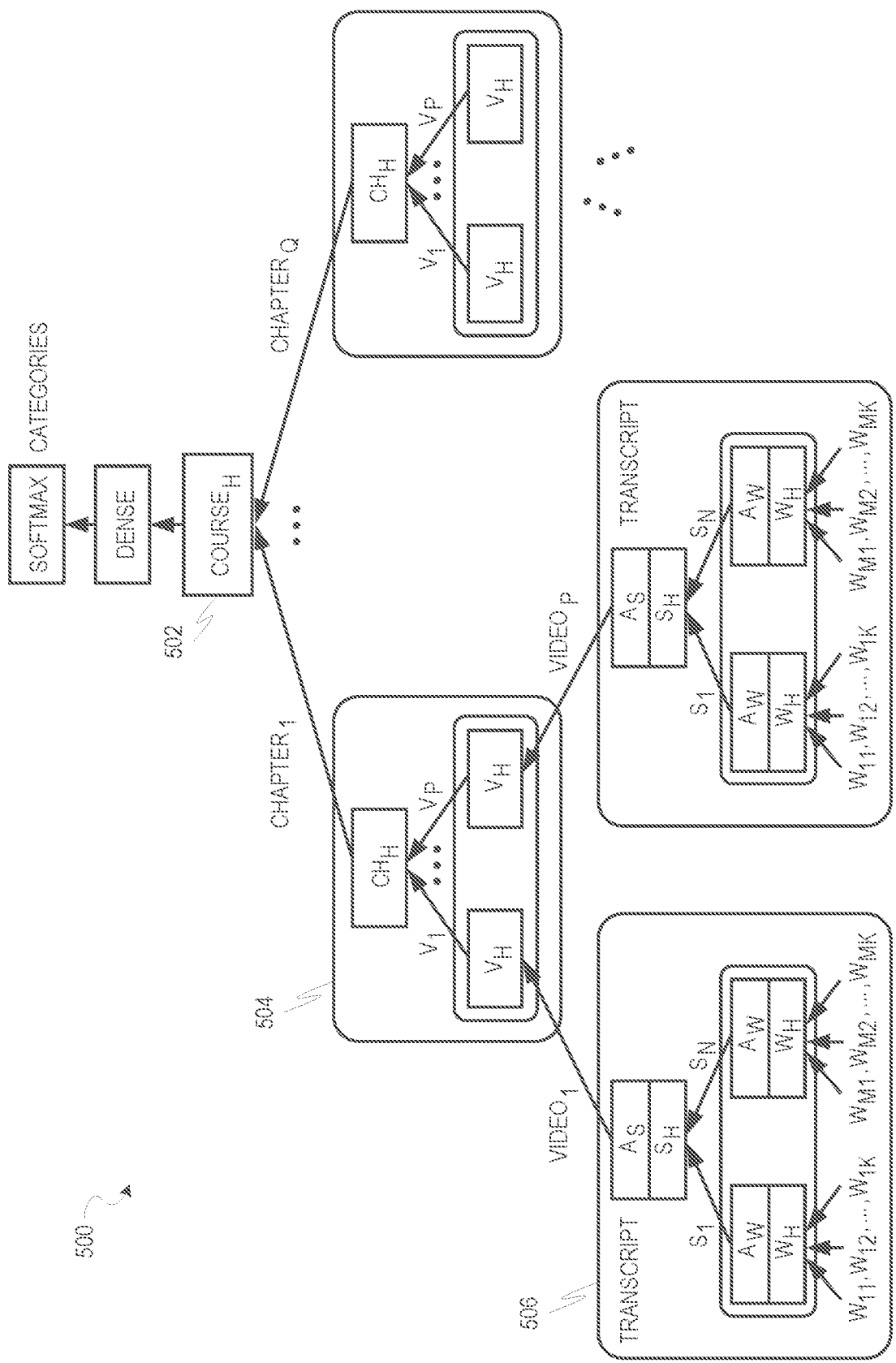
FIG. 5 is a diagram illustrating a hierarchical architecture for learning courses, in accordance with an example embodiment.

While the above example is described in terms of document hierarchy with two levels (sentence and word) below the document level, in some example embodiments other types and sizes of hierarchies may be used in a similar fashion. These hierarchies may also be stacked. FIG. 5 is a diagram illustrating a hierarchical architecture 500 for learning courses in accordance with an example embodiment. Here, a learning course constitutes a series of chapters, each chapter including a series of videos. Thus, the highest level is the course level 502. The next level down is the chapter level 504, and the next level down the video level 506. Each video in the video level 506 may be transcribed into a transcript that can be handled as a document is using the architecture of FIG. 4.

Notably, hierarchical classification of the type described throughout this document not only yields the advantage of parameter sharing across levels, but also allows for individual classification of particular items at each level. The above examples only performed the classification at the softmax layer 412 at the top-most level, but similar classification can be performed at any layer. Thus, for example, in the course example of FIG. 5, the content may not only be classified based on quality at the course level 502, but individual chapters could also be classified, as well as individual videos. The result is that, for example, an individual chapter or video could be labeled as spam and removed or otherwise not depicted while other chapters or videos in the same course could be labeled as "clear".

In an example embodiment, the possible classifications for content quality can include clear, low quality, and spam, with clear being the highest quality, spam being the lowest, and low quality being in the middle. These classifications may be used in a variety of ways in the social networking service. In one example embodiment, pieces of content are filtered based on the quality classification, with "clear" content being presented as normal, "low quality" content being presented only to users who have a first degree relationship with the sharer of the content (and the content otherwise blocked to other users), and "spam" content being blocked for all users.

In other example embodiments, more advanced categorizations may be used for greater granularity. For example, spam classifications may be broken into sub-classifications such as "spam: adult," "spam: commercial spam," "spam: harassment." "spam: gratuitously shocking," "spam: hate speech," "spam: money scam," and "spam: other irrelevant spam." Low quality classifications may be broken into sub-classifications such as "Low Quality. Adult," "Low Quality: Meme and Puzzle," "Low Quality: Promotion," "Low Quality: Personal—Self Promotion," "Low Quality Personal—Political Belief." "Low Quality: Shocking—Global Event," "Low Quality. Non-Paid-for Job Posting." Each of these sub-classifications may have different handling rules as to when and under what conditions to block or display the corresponding content.

In some example embodiments, the user themself may have some level of control as to how certain classifications of content are handled. For example, a highly political user may wish to see content labeled "Low Quality. Personal—Political Belief" no matter the connection between the user and the sharer. User-level settings may be stored for each user, permitting such different handling of different classifications.

Figure 6:
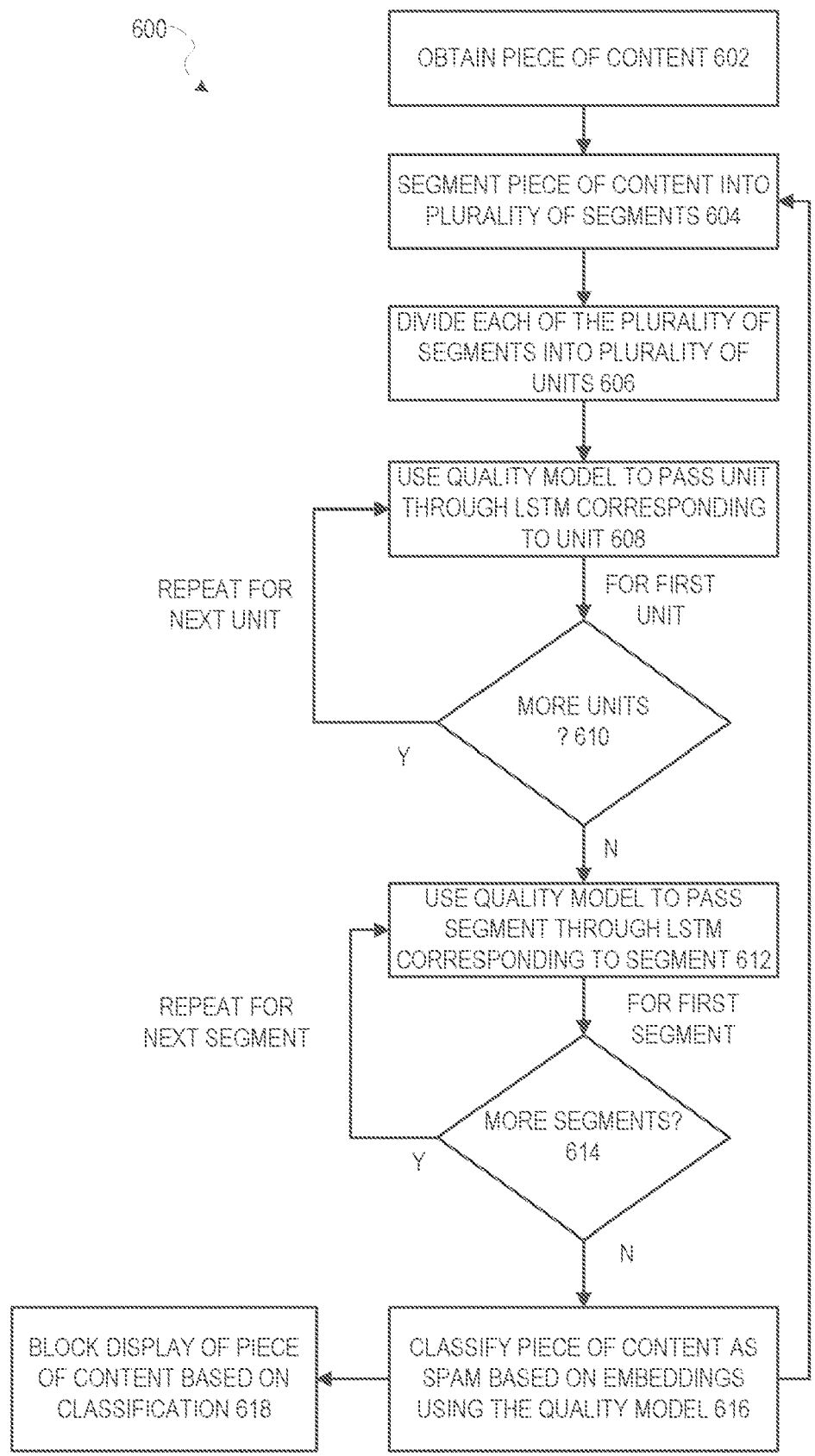
FIG. 6 is a flow diagram illustrating a method for classifying a piece of content as spam in accordance with an example embodiment. At operation, a piece of content is obtained.

FIG. 6 is a flow diagram illustrating a method 600 for classifying a piece of content as spam in accordance with an example embodiment. At operation 602, a piece of content is obtained. At operation 601, the piece of content is segmented into a plurality of segments In an example embodiment, each segment is a sentence. At operation 606, each of the plurality of segments is divided into a plurality of units. In an example embodiment, each unit is a word A loop is then performed for each of the plurality of units for each segment. At operation 608, a quality model is used to pass the unit through an LSTM corresponding to the unit, causing an embedding of the unit. At operation 610, it is determined if there are any more units in the segment. If so, then the method 600 loops hack to operation 608 for the next unit in the segment. If not, the method 600 moves to operation 612.

A loop is begun for each of the plurality of segments for the piece of content. At operation 612, the quality model is used pass the segment, and one or more parameters obtained from LSTMs corresponding to units within the segment, through an LSTM corresponding to the segment, causing an embedding of the segment. At operation 614, it is determined if there are any more segments in the piece of content. If so, then the method 600 loops back to operation 612 for the next segment in the piece of content. If not, then the method 600 moves to operation 616.

At operation 616, the piece of content is classified as spam based on the embeddings of the plurality of segments for the piece of content, using the quality model. At operation 618, display of the pieces of content is blocked based on its classification as spam.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly the methods described herein may be at least partially precessor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments processors or processor-implemented modules may be distributed across a number of geographic locations.

Machine and Software Architecture

The modules, methods applications, and so forth described in conjunction with FIGS. 1-6 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of Things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 7:
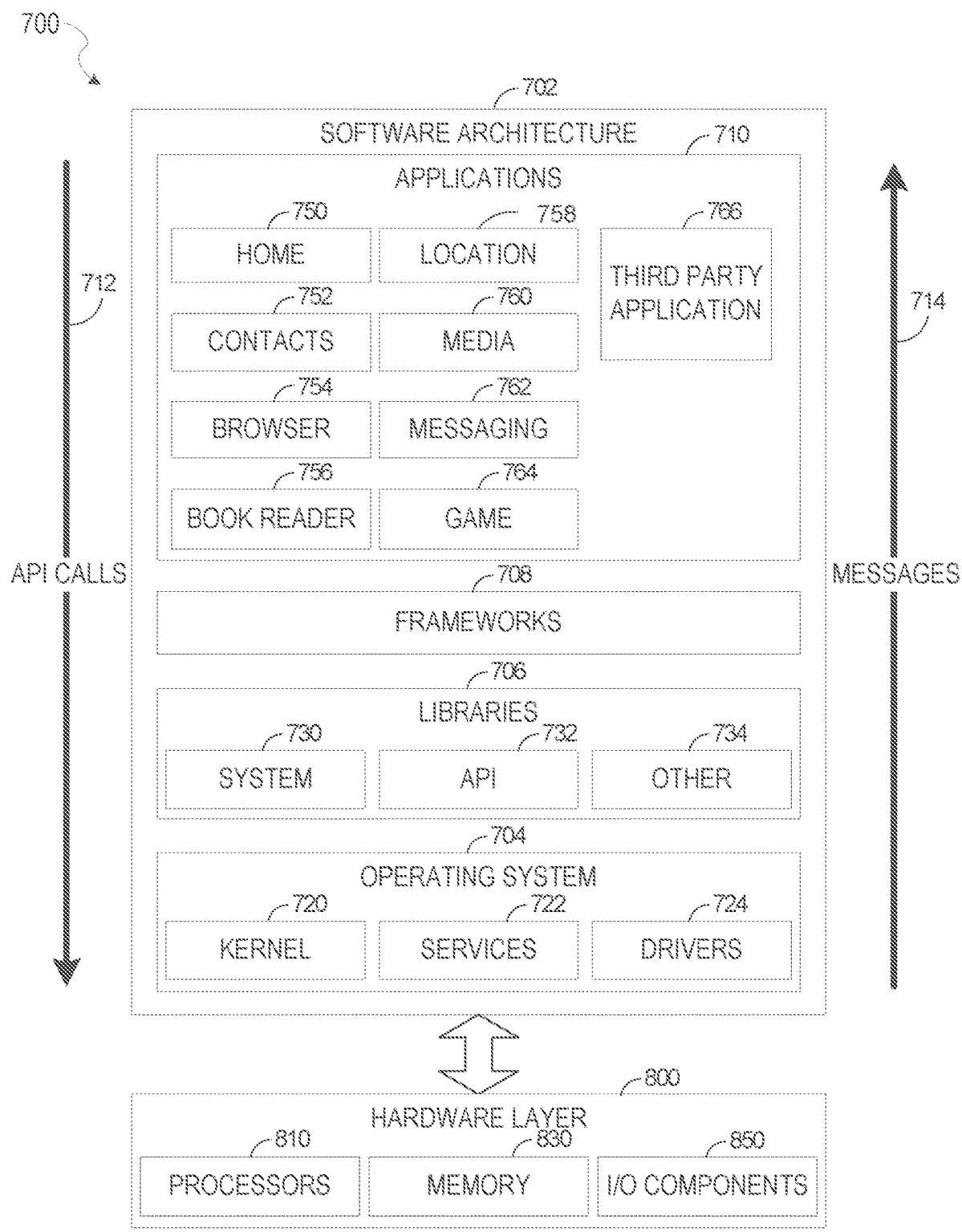
FIG. 7 is a block diagram illustrating a representative software architecture, which may be used in conjunction with various hardware architectures herein described.

FIG. 7 is a block diagram 700 illustrating a representative software architecture 702, which may be used in conjunction with various hardware architectures herein described FIG. 7 is merely a non-limiting example of a software architecture, and it will be appreciated that many other architectures may be implemented to facilitate the functionality described herein. The software architecture 702 may be executing on hardware such as a machine 800 of FIG. 8 that includes, among other things, processors 810, memory 830, and I/O components 850. A representative hardware layer 800 is illustrated and can represent, for example, the machine 800 of FIG. 8. The representative hardware layer 800 comprises one or more processors 810. The executable instructions represent the executable instructions of the software architecture 702, including implementation of the methods, modules, and so forth of FIGS. 1-6. The hardware layer 800 also includes the memory/storage 830, which also has the executable instructions.

In the example architecture of FIG. 7, the software architecture 702 may be conceptualized as a stack of layers where each layer provides particular functionality. For example, the software architecture 702 may include layers such as an operating system 704, libraries 706, frameworks/middleware 708, and applications 710. Operationally, the applications 710 and/or other components within the layers may invoke API calls 712 through the software stack and receive responses, returned values, and so forth, illustrated as messages 714, in response to the API calls 712. The layers illustrated are representative in nature and not all software architectures have all layers. For example, some mobile or special-purpose operating systems may not provide a layer of frameworks/middleware 708, while others may provide such a layer. Other software architectures may include additional or different layers.

The operating system 704 may manage hardware resources and provide common services. The operating system 704 may include, for example, a kernel 720, services 722, and drivers 724. The kernel 720 may act as an abstraction layer between the hardware and the other software layers. For example, the kernel 720 may be responsible for memory management, processor management (e.g., scheduling), component management, networking, security settings, and so on. The services 722 may provide other common services for the other software layers. The drivers 724 may be responsible for controlling or interfacing with the underlying hardware. For instance, the drivers 724 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 706 may provide a common infrastructure that may be utilized by the applications 710 and/or other components and/or layers. The libraries 706 typically provide functionality that allows other software modules to perform tasks in an easier fashion than by interfacing directly with the underlying operating system 704 functionality (e.g., kernel 720, services 722, and/or drivers 724). The libraries 706 may include system libraries 730 (e.g., C standard library) that may provide functions such as memory allocation functions, string manipulation functions, mathematical functions, and the like. In addition, the libraries 706 may include API libraries 732 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 706 may also include a wide variety of other libraries 734 to provide many other APIs to the applications 710 and other software components/modules.

The frameworks 708 (also sometimes referred to as middleware) may provide a higher-level common infrastructure that may be utilized by the applications 710 and/or other software components/modules. For example, the frameworks 708 may provide various graphic user interface (GUI) functions, high-level resource management, high-level location services, and so forth. The frameworks 708 may provide a broad spectrum of other APIs that may be utilized by the applications 710 and/or other software components/modules, some of which may be specific to a particular operating system 704 or platform.

The applications 710 include third-party applications 766. Examples of representative built-in applications may include, but are not limited to, a home application 750, a contacts application 752, a browser application 754, a book reader application 756, a location application 758, a media application 760, a messaging application 762, and/or a game application 764. The third-party applications 766 may include any of the built-in applications as well as a broad assortment of other applications. In a specific example, the third-party application 766 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 766 may invoke the API calls 712 provided by the mobile operating system such as the operating system 704 to facilitate functionality described herein.

The applications 710 may utilize built-in operating system 704 functions (e.g., kernel 720, services 722, and/or drivers 724), libraries 706 (e.g., system libraries 730, API libraries 732, and other libraries 734), and frameworks/middleware 708 to create user interfaces to interact with users of the system. Alternatively, or additionally, in some systems, interactions with a user may occur through a presentation layer. In these systems, the application/module "logic" can be separated from the aspects of the application/module that interact with a user.

Example Machine Architecture and Machine-Readable Medium

Figure 8:
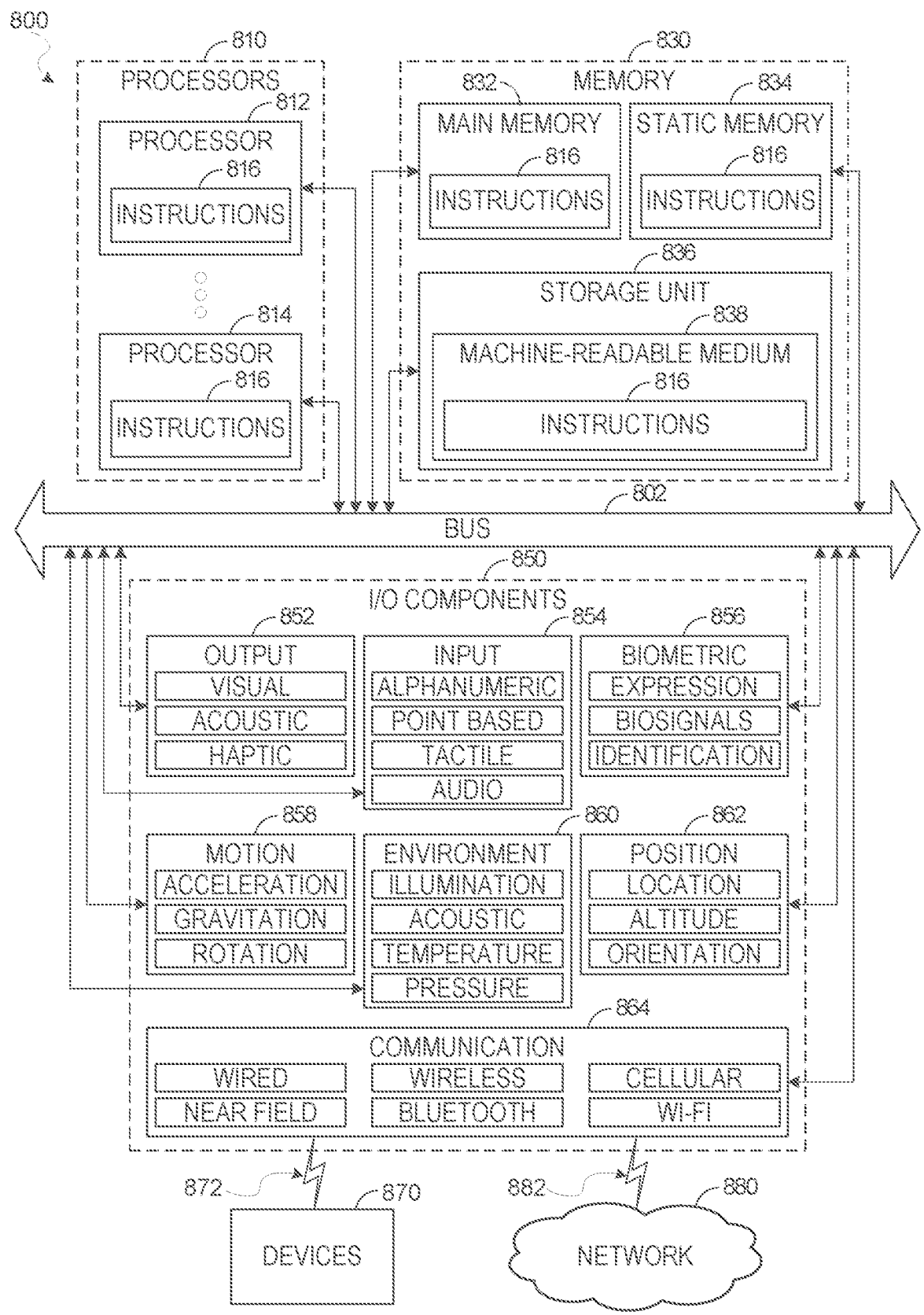
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. The instructions 816 transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute the instructions 816 contemporaneously. Although FIG. 8 shows multiple processors 810, the machine 800 may include a single processor 812 with a single core, a single processor 812 with multiple cores (e.g., a multi-core processor 812), multiple processors 810 with a single core, multiple processors 810 with multiple cores, or any combination thereof.

The memory 830 may include a memory 832, such as a main memory, or other memory storage, such as a static memory 834, and a storage unit 836, each accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the main memory 832, the storage unit 836, and the memory of the processors 810 are examples of machine-readable media 838.

As used herein, "machine-readable medium" means a device able to store the instructions 816 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., the instructions 816) for execution by a machine (e.g., the machine 800), such that the instructions, when executed by one or more processors of the machine (e.g., the processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and soon. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure front which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or other suitable device to interface with the network 880. In further examples, the communication components 864 may include wired communication components, wireless communication components, cellular communication components, near-field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF47, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 may be transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fail within a scope of embodiments of the present disclosure as represented by the appended claims. The specification and drawings are, accordingly, to be regarded in an illustrative rather than a restrictive sense

What is claimed is:

1. A system comprising:
a memory storing a quality model comprising a hierarchy of long short-term memories (LSTM) and a classification layer; and
a non-transitory computer-readable medium having instructions stored thereon, which, when executed by a processor, cause the system to:
obtain a piece of content;
generate a piece of content-level vector for the piece of content;
segment the piece of content-level vector into a plurality of segments;
divide each of the plurality of segments into a plurality of units;
for each unit of the plurality of units within a first segment, use the quality model to pass the unit through an LSTM corresponding to the unit from a first set of LSTMs corresponding to units within the first segment, causing an embedding of the unit and generating one or more parameters, the first set of LSTMs at a first level of the hierarchy, the passing the unit including obtaining a set of one or more class labels for the unit using a first softmax layer to classify the unit;
share the one or more parameters generated from the first set of LSTMs corresponding to the units within the first segment to a segment-level LSTM corresponding to the first segment, the segment-level LSTM at a second level of the hierarchy different than the first level of the hierarchy;
pass the first segment through the segment-level LSTM corresponding to the first segment, causing an embedding of the segment using the shared parameters;
classify the piece of content as spam based on embeddings of the plurality of segments for the piece of content, using the quality model; and
block display of the piece of content based on its classification as spam.

2. The system of claim 1, wherein the segments are sentences and the units are words.

3. The system of claim 1, wherein each LSTM is a bidirectional LSTM.

4. The system of claim 1, wherein the classifying includes using a softmax later to classify the piece of content.

5. The system of claim 1, wherein the instructions further cause the system to classify the segments into one of a plurality of different quality categories based on embeddings of a plurality of words corresponding to each of the segments.

6. The system of claim 1, wherein each piece of content is a learning course, each segment is a chapter, and each unit is a video.

7. The system of claim 6, wherein the instructions further cause the system to transcribe each video prior to passing the videos through LSTMs corresponding to each video.

8. The system of claim 1, wherein each embedding is a segment-level vector generated based on a set of class labels for the corresponding segment.

9. A computerized method comprising:
obtaining a piece of content;
generating a piece of content-level vector for the piece of content;
segmenting the piece of content-level vector into a plurality of segments;
dividing each of the plurality of segments into a plurality of units;
for each unit of the plurality of units within a first segment, using the quality model to pass the unit through an LSTM corresponding to the unit from a first set of LSTMs corresponding to units within the first segment, causing an embedding of the unit and generating one or more parameters, the first set of LSTMs at a first level of the hierarchy, the passing the unit including obtaining a set of one or more class labels for the unit using a first softmax layer to classify the unit;
sharing the one or more parameters generated from the first set of LSTMs corresponding to the units within the first segment to a segment-level LSTM corresponding to the first segment, the segment-level LSTM at a second level of the hierarchy different than the first level of the hierarchy;

passing the first segment through the segment-level LSTM corresponding to the first segment, causing an embedding of the segment using the shared parameters;

classifying the piece of content as spam based on embeddings of the plurality of segments for the piece of content, using the quality model; and block display of the piece of content based on its classification as spam.

10. The computerized method of claim 9, wherein the segments are sentences and the units are words.

11. The computerized method of claim 9, wherein each LSTM is a bidirectional LSTM.

12. The computerized method of claim 9, wherein the classifying includes using a softmax later to classify the piece of content.

13. The computerized method of claim 9, further comprising classifying the segments into one of a plurality of different quality categories based on embeddings of a plurality of words corresponding to each of the segments.

14. The computerized method of claim 9, wherein each piece of content is a learning course, each segment is a chapter, and each unit is a video.

15. The computerized method of claim 14, further comprising transcribing each video prior to passing the videos through LSTMs corresponding to each video.

16. A non-transitory machine-readable storage medium comprising instructions, which when implemented by one or more machines, cause the one or more machines to perform operations comprising:

obtaining a piece of content;

generating a piece of content-level vector for the piece of content;

segmenting the piece of content-level vector into a plurality of segments;

dividing each of the plurality of segments into a plurality of units;

for each unit of the plurality of units within a first segment, using the quality model to pass the unit through an LSTM corresponding to the unit from a first set of LSTMs corresponding to units within the first segment, causing an embedding of the unit and generating one or more parameters, the first set of LSTMs at a first level of the hierarchy, the passing the unit including obtaining a set of one or more class labels for the unit using a first softmax layer to classify the unit;

sharing the one or more parameters generated from the first set of LSTMs corresponding to the units within the first segment to a segment-level LSTM corresponding to the first segment, the segment-level LSTM at a second level of the hierarchy different than the first level of the hierarchy;

passing the first segment through the segment-level LSTM corresponding to the first segment, causing an embedding of the segment using the shared parameters;

classifying the piece of content as spam based on embeddings of the plurality of segments for the piece of content, using the quality model; and block display of the piece of content based on its classification as spam.

17. The non-transitory machine-readable storage medium of claim 16, wherein the segments are sentences and the units are words.

18. The non-transitory machine-readable storage medium of claim 16, wherein each LSTM is a bidirectional LSTM.

19. The non-transitory machine-readable storage medium of claim 16, wherein the classifying includes using a softmax later to classify the piece of content.

20. The non-transitory machine-readable storage medium of claim 16, wherein the instructions further comprise classifying the segments into one of a plurality of different quality categories based on embeddings of a plurality of words corresponding to each of the segments.

21. The non-transitory machine-readable storage medium of claim 16, wherein each piece of content is a learning course, each segment is a chapter, and each unit is a video.

\* \* \* \* \*